US007761860B2

(12) United States Patent
Koo et al.

(10) Patent No.: US 7,761,860 B2
(45) Date of Patent: Jul. 20, 2010

(54) PRE-COMPILING DEVICE

(75) Inventors: Ji-hun Koo, Yongin-si (KR); Sergey Pyptev, Moscow (RU); Timofei Istomin, Moscow (RU); Woo-shik Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 1202 days.

(21) Appl. No.: 11/345,221

(22) Filed: Feb. 2, 2006

(65) Prior Publication Data

US 2006/0179426 A1    Aug. 10, 2006

(30) Foreign Application Priority Data

Feb. 4, 2005    (KR)    ................. 10-2005-0010646

(51) Int. Cl.
G06F 9/45    (2006.01)
(52) U.S. Cl. ...................................... 717/143; 717/142
(58) Field of Classification Search ................. 717/142, 717/143, 144, 146
See application file for complete search history.

(56) References Cited

U.S. PATENT DOCUMENTS

| 5,778,231 | A * | 7/1998 | van Hoff et al. ............. 717/143 |
| 6,173,437 | B1 * | 1/2001 | Polcyn ....................... 717/100 |
| 6,230,312 | B1 * | 5/2001 | Hunt ........................ 717/108 |
| 6,993,466 | B2 * | 1/2006 | Kodosky et al. ............. 703/2 |
| 7,010,470 | B2 * | 3/2006 | Kodosky et al. ............. 703/2 |
| 7,177,786 | B2 * | 2/2007 | Kodosky et al. ............. 703/2 |
| 7,296,264 | B2 * | 11/2007 | Zatloukal et al. ........... 717/143 |
| 7,467,376 | B2 * | 12/2008 | Le Metayer et al. ......... 717/143 |
| 2003/0221068 | A1 * | 11/2003 | Tsuji et al. ................. 711/126 |
| 2004/0255046 | A1 * | 12/2004 | Ringseth et al. ............. 709/246 |
| 2005/0015759 | A1 * | 1/2005 | Zatloukal ..................... 717/140 |
| 2005/0042593 | A1 * | 2/2005 | Hopkins et al. ............. 434/350 |
| 2005/0138612 | A1 * | 6/2005 | Asao ........................... 717/152 |
| 2005/0166195 | A1 * | 7/2005 | Kawahito ..................... 717/154 |
| 2005/0211759 | A1 * | 9/2005 | Breslin et al. ............... 235/375 |
| 2005/0216869 | A1 * | 9/2005 | Miyachi et al. ................ 716/3 |
| 2006/0095274 | A1 * | 5/2006 | Phillips et al. ................. 705/1 |
| 2006/0123405 | A1 * | 6/2006 | O'Brien et al. .............. 717/150 |
| 2006/0136872 | A1 * | 6/2006 | Barr et al. .................... 717/114 |
| 2006/0168013 | A1 * | 7/2006 | Wilson et al. ............... 709/206 |
| 2006/0236310 | A1 * | 10/2006 | Domeika et al. ............ 717/140 |
| 2007/0006139 | A1 * | 1/2007 | Rubin et al. ................. 717/106 |
| 2007/0033580 | A1 * | 2/2007 | Ringseth et al. ............. 717/137 |
| 2007/0288914 | A1 * | 12/2007 | Brannock et al. ........... 717/169 |
| 2008/0059545 | A1 * | 3/2008 | Brady et al. ................. 707/204 |
| 2008/0244511 | A1 * | 10/2008 | Chaoweeraprasit et al. . 717/109 |
| 2009/0049514 | A1 * | 2/2009 | Yan et al. ....................... 726/1 |
| 2009/0210826 | A1 * | 8/2009 | Sierer et al. ................. 715/853 |

* cited by examiner

Primary Examiner—Anna Deng
(74) Attorney, Agent, or Firm—Sughrue Mion, PLLC

(57) ABSTRACT

A method for and a pre-compiling device capable of easily changing a software structure in compliance with a hardware characteristic. The pre-compiling device includes a source code scanner for scanning for a source code file, retrieving a configuration directive, analyzing a syntax of the directive, and outputting a tree of a lexical unit corresponding to the retrieved configuration directive; a core for outputting the configuration directive in a configuration state; code generation modules for outputting a configuration state output from the core as a programming language that has no correlation with a flow of the lexical unit; and programming language modules for transferring information on a comment syntax of the corresponding language to the source code scanner and the code generation modules, and receiving the programming language that has no correlation with the flow of the lexical unit outputted from the code generation modules and outputting source codes.

11 Claims, 4 Drawing Sheets

PRE-COMPILING DEVICE

CROSS-REFERENCE TO RELATED APPLICATIONS

This application claims priority from Korean Patent Application No. 10-2005-0010646, filed on Feb. 4, 2005, the entire content of which is incorporated herein by reference.

BACKGROUND OF THE INVENTION

1. Field of the Invention

The present invention relates to a pre-compiling device and a method thereof. More specifically, the present invention relates to a pre-compiling device and a method of easily changing a software structure in compliance with a hardware characteristic.

2. Description of the Related Art

Generally, flexibility of a software system can be defined as whether or not the software system can be easily adapted in different circumstances. That is, flexible software can be easily portable into different hardware platforms. When designing a flexible software system, it is essential to employ equipment with somewhat complicated configuration.

In order to realize portability and scalability, source codes should be easily adapted to different hardware parameters (for example, memory size and interrupt request (IRQ) number). Furthermore, different platforms can require different algorithms to perform the same task. Accordingly, algorithm replacement and tuning capability should be supported by a configuration technique. Tuning includes a data type on which the algorithm depends and a few variable constants.

Efficiency of software can be affected by the flexibility. Dynamic, flexible software can restructure itself at run time. In the dynamic, flexible software, the efficiency potentially reduces due to a possible overhead of such a dynamic structure change. In order to avoid the overhead, determinations can be made statically in many cases. That is, if only codes needed in a specific case are extracted from an entire project source and all of other dynamic tests and determinations are excluded, it is possible to obtain compact software having limited functionality needed in the specific case. Accordingly, static resource management and a possibility of including or excluding a source portion should be supported by the configuration technique.

Extensible Markup Language (XML) is a language based on a text that is commonly used to define data elements in a standard scheme. In the XML, a tag structure is used and tags are defined by a document developer. Accordingly, practically any data item can be recognized by the XML.

Meanwhile, software grammar that can be simultaneously applied to a large number of various hardware platforms on a sensor network is needed. Conventionally, there were two methods to solve the problem described above. The two methods are a dynamic change method during run time and a static change method during compiling. The first method has a drawback that OS (operating system) source codes of a Microsoft (MS) window are not suitable for a hardware platform having ultra-light resources. The second method uses a directive, which has a drawback that it is not efficient to simultaneously apply the software developed with the second method to a variety of platforms because each platform is assigned a different directive.

SUMMARY OF THE INVENTION

The present invention has been developed in order to solve the above drawbacks and other problems associated with the conventional device. Illustrative, non-limiting embodiments of the present invention may overcome the above drawbacks and other problems not described above. The present invention is not necessarily required to overcome any of the disadvantages described above, and the illustrative, non-limiting embodiments of the present invention may not overcome any of the problems described above. The appended claims should be consulted to ascertain the true scope of the invention.

The present invention provides a method for and a pre-compiling device capable of easily changing a software structure in compliance with a hardware characteristic using a configuration state representation, a configuration integrity controller, a configuration language interpreter, a code generation module, and a programming language module.

According to an aspect of the present invention, there is provided a pre-compiling device comprising a source code scanner for scanning for a source code file, retrieving a configuration directive, analyzing a syntax of the directive, and outputting a tree of a lexical unit corresponding to the configuration directive retrieved from the source code; a core for outputting the outputted configuration directive in a configuration state; a GUI (Graphical User Interface) for providing a conversation between the core and a user, and representing an internal configuration state, and representing a current configuration state using a variable value input by a user; code generation modules for outputting the configuration state provided by the core as a programming language that has no correlation with a flow of the lexical unit; and programming language modules for transferring information on a comment syntax of the corresponding language to the source code scanner and the code generation modules, and receiving the programming language that has no correlation with the flow of the lexical unit outputted from the code generation module and outputting source codes.

Preferably, but not necessarily, the pre-compiling device further includes an external language module being added to the programming language modules, expanding a configurator functionality without correcting a configuration program. The external language module may be written in an XML-based language.

Preferably, but not necessarily, the pre-compiling device further includes an external code generation module being added to the code generation modules, expanding the configurator functionality without correcting a configuration program. The external language module may be written in an XML-based language.

Preferably, but not necessarily, the core of the pre-compiling device includes a configuration state representation unit for establishing an internal structure of the configuration and for outputting the configuration state as an object internal data while the source code scanner is scanning the source codes; a configuration integrity controller for checking defects of the configuration directive output from the source code scanner and user input, and outputting a corrected report; and a configuration language interpreter for outputting the configuration directive represented internally as a configuration state and for performing the configuration directive.

Preferably, but not necessarily, the pre-compiling device further includes an external language module for being added to the programming language, expanding a configurator functionality without correcting a configuration program. The external language module is written in an XML-based language.

Preferably, but not necessarily, the pre-compiling device further includes an external code generation module for being added to the code generation modules, expanding a configurator functionality without correcting a configuration program. The external code generation module is written in an XML-based language.

According to an aspect of the present invention, there is provided a pre-compiling method including scanning a source code file, retrieving a configuration directive, analyzing a syntax of the directive, and outputting a tree of a lexical unit corresponding to the configuration directive searched from the source code, outputting the output configuration directive in a configuration state, representing a current configuration state by representing the output configuration state and inputting a user variable, outputting the output configuration state in a programming language which has no correlation with a flow of the lexical unit, and transmitting information on a comment syntax of a corresponding language, receiving the programming language which has no correlation with the flow of the lexical unit, and outputting the source code.

Preferably, but not necessarily, the pre-compiling method further includes adding an external language module to a programming language module, expanding a configurator functionality without correcting a configuration program, and writing the external language module in an XML-based language.

Preferably, but not necessarily, the pre-compiling method further includes adding an external code generation module to a code generation module, expanding the configurator functionality without correcting the configuration program, and writing the external code generation module in the XML-based language.

Preferably, but not necessarily, the outputting output configuration state includes establishing an internal structure of the configuration while the source code is scanned, and outputting the configuration state as an object internal data, checking defects of the output configuration directive and a user input, and outputting a corrected report, and outputting the internally represented configuration directive in a configuration state and performing the configuration directive.

Preferably, but not necessarily, the pre-compiling method further includes adding an external language module to a programming language module, expanding a configurator functionality without correcting a configuration program, and writing the external language module in an XML-based language.

Preferably, but not necessarily, the pre-compiling method further includes adding an external code generation module to a code generation module, expanding the configurator functionality without correcting the configuration program, and writing the external code generation module in the XML-based language.

BRIEF DESCRIPTION OF THE DRAWINGS

The above aspects and/or other aspects of the present invention will be more apparent by describing in detail exemplary embodiments of the present invention with reference to the accompanying drawings, in which.

DETAILED DESCRIPTION OF THE EXEMPLARY EMBODIMENTS

Figure 1:
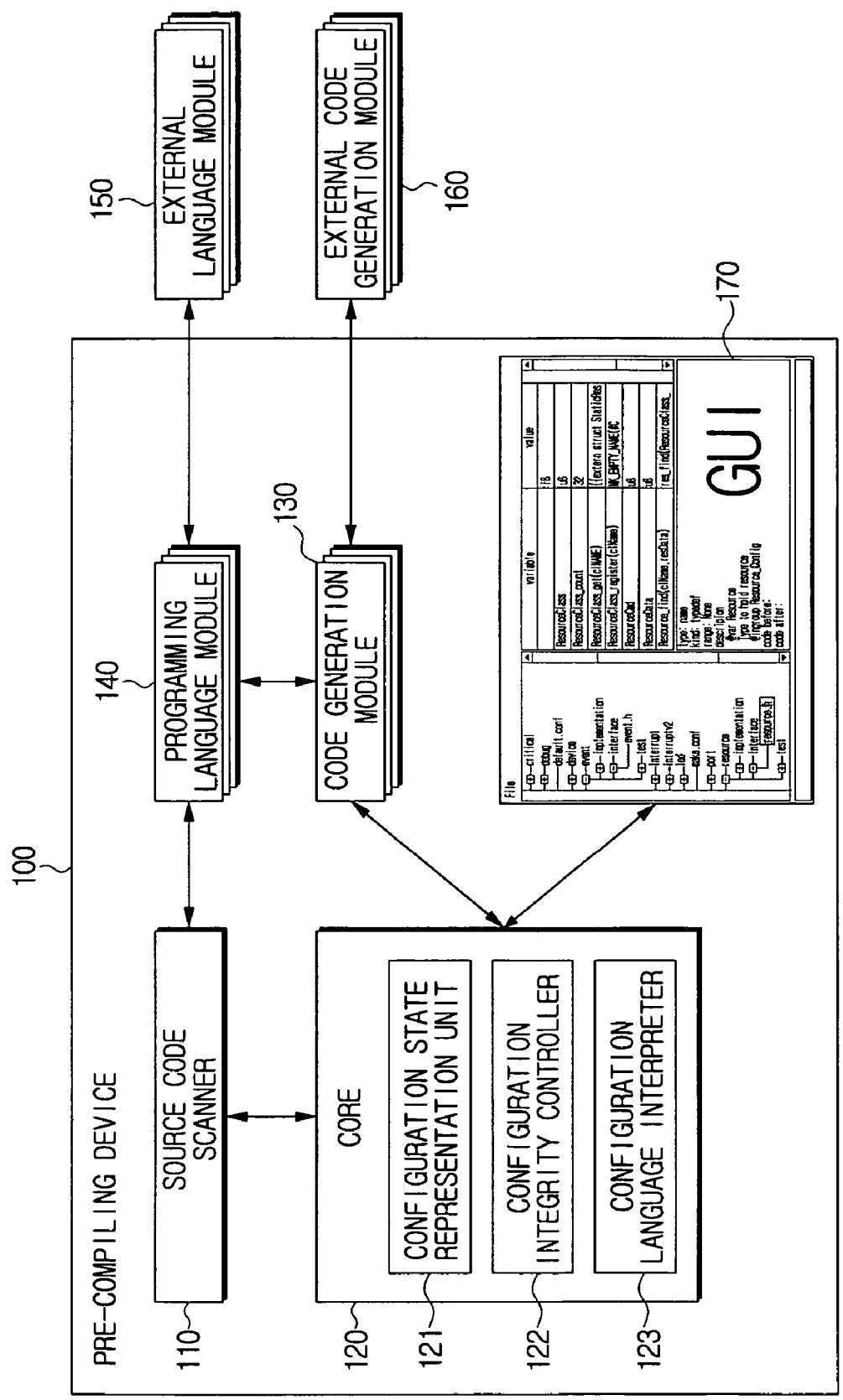
FIG. 1 is a block configuration diagram of a pre-compiling device in accordance with an exemplary, non-limiting embodiment of the present invention.

Hereinafter, exemplary embodiments of the present invention will be described in greater detail with reference to the accompanying drawings. In the drawings, same numeric references denote analogous elements.

FIG. 1 is a block configuration diagram of a pre-compiling device in accordance with an exemplary embodiment of the present invention. Referring to FIG. 1, the pre-compiling device 100 in accordance with the exemplary embodiment of the present invention includes a source code scanner 110 for detecting a configuration directive, a core 120 having a configuration state representation unit 121, a configuration integrity controller 122, and a configuration language interpreter 123, code generation modules 130 for generating codes in various programming languages, and programming language modules 140 for transferring information relating to grammar of a corresponding language to the source code scanner 110 and code generation modules 130.

The core 120 includes the configuration state representation unit 121 for establishing an internal structure of the configuration, the configuration integrity controller 122 for testing integrity of a configuration grammar, and the configuration language interpreter 123 for performing the configuration directive.

As shown in FIG. 1, when the source code scanner 110 receives project source codes as an input, it scans all source code files and retrieves the configuration directive. The configuration directive is located in a specific comment which depends on a file format. Further, the source code scanner analyzes the syntax of the configuration directive. Subsequently, a tree of lexical units corresponding to the configuration directives retrieved from the source codes is output. In the output configuration directive, its configuration state is output through the core 120.

Hereinafter, an internal operation of the core 120 will be described. The configuration state representation unit 121 summarizes data types in order to store and manipulate an internal structure of the configuration state. While scanning the source code, the internal structure of the configuration state is established. A type of image of the project configuration is called a configuration state representation. When inputting configuration state modification primitives, the configuration state is output as object internal data.

The configuration integrity controller 122 checks defects of the directive and user input. Accordingly, when a configuration directive internally represented is input, a corrected report is output.

The configuration language interpreter 123 performs a configuration directive. Accordingly, when the configuration directive internally represented is input, a configuration state is output.

The code generation module 130 represents values of configuration objects in a programming language format. A 'kind' attribute of the configuration objects is a name of the code generation module. When the code generation module 130 receives a configuration state output from the configuration language interpreter 123, the code generation module 130 outputs a programming language which has no correlation with a flow of a lexical unit. For example, in a configuration variable A of a string type, when the variable includes a value 'int' for the variable A, two of other programming languages can be generated depending on a code generation module selected. "typedef int A;" can be generated as a type definition for C and "#define A int" can be generated as a macro definition for C.

The programming language module 140 transfers information on a comment syntax of a corresponding language to the source code scanner 110 and the code generation modules 130. Further, the programming language module 140 receives a programming language, which has no correlation with a flow of a lexical unit output from the code generation modules 130, and outputs a source code.

An external language module 150 and an external code generation module 160 are added to a configurator palette to upgrade the configurator. The external language module 150 and the external code generation module 160 expand or overload hard coded modules to refine the modules. The external module can expand the configurator functionality without modifying the configuration program. The external modules can be written in an XML-based language.

For example, in order to generate repeated codes from a configuration array, a proper external code generator can be formed. When a configuration array has 1, 2, 3, 4, and 5 and a desired generated code is int*a={f(1), f(2), f(3), f(4), f(5)}, the external module can be described in the following scheme.

```
<codegen_module name="apply_f">
  <object class="array">
    <element out="f(@element_in)">
    </element>
  </object>
</codegen_module>
```

Further, the external module is used in an array declaration as follows. <array name="a" kind="apply_f" values="1 2 3 4 5"/>

Graphical User Interface (GUI) 170 provides for a conversation between a user and a configurator core 120 and represents an internal configuration state. Further, the GUI 170 represents a current configuration state by receiving variable values from the user.

Figure 2:
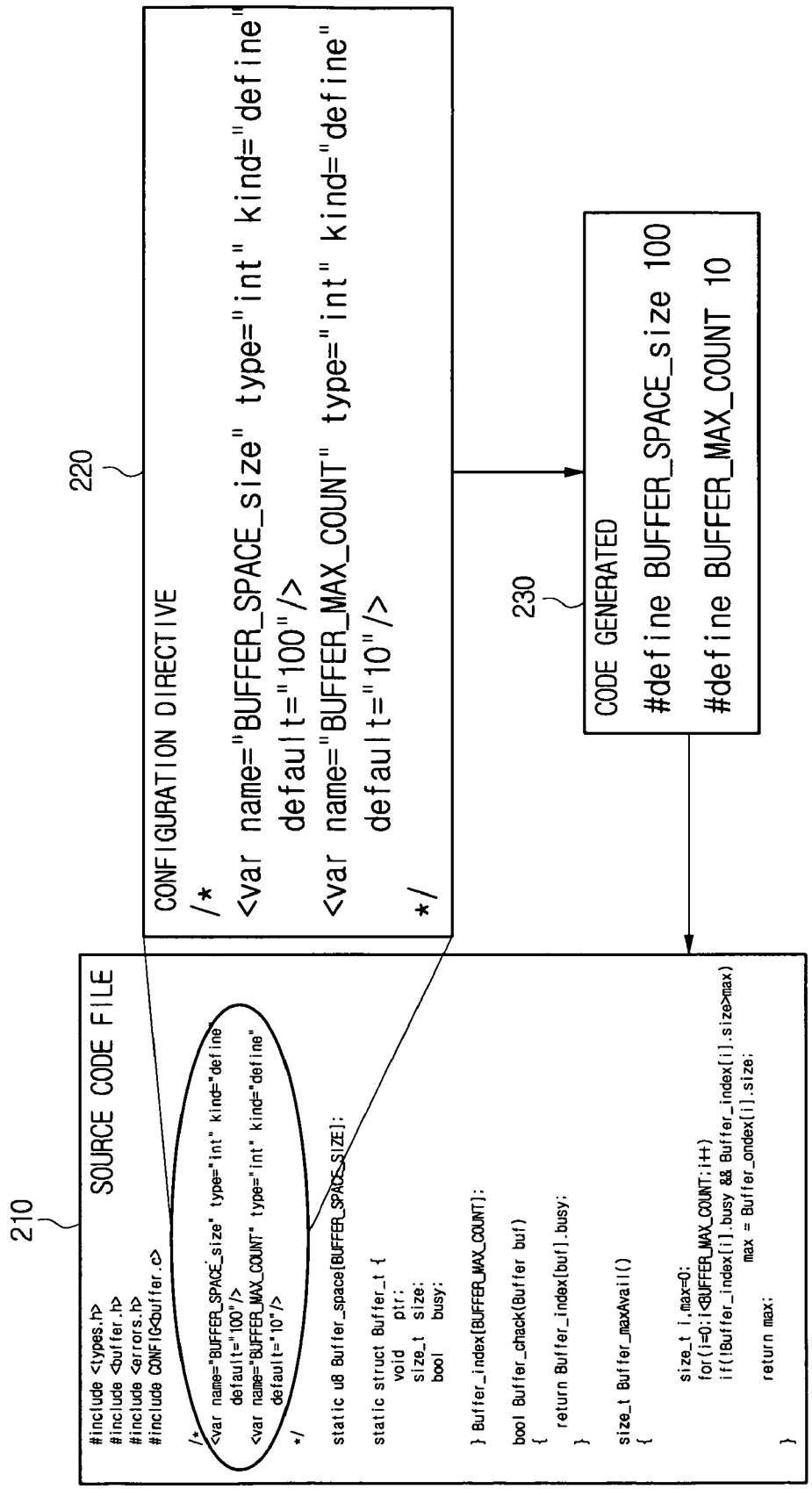
FIG. 2 is a schematic view showing a procedure where a code is generated in a source code file input into a pre-compiling device in accordance with an exemplary, non-limiting embodiment of the present invention.

FIG. 2 is a schematic view showing a procedure where a code is generated in a source code file input to a pre-compiling device in accordance with an exemplary embodiment of the present invention. Based on a source code file 210 input into the pre-compiling device in accordance with an exemplary embodiment of the present invention, the source code scanner outputs a state of a configuration directive 220, and the code generation module generates codes 230. The programming language that has no correlation with a flow of a lexical unit output from the code generation module is replaced with an original source code file.

In a first exemplary embodiment of a pre-compiling device in accordance with the present invention, when a source code file described below is inputted,

```
/*
<var name="file_id" type="int" kind="typedef"/>
*/
``` the generated codes (when a user assigned an "int" value) becomes
    typedef int file_id;

In a second exemplary embodiment of a pre-compiling device in accordance with the present invention, when a source code file described below is inputted,

```
/*
<var name="file_id" type="int" kind="define"/>
*/
```

The generated code (when the user assigned the "int" value) becomes
    #define file_id int.

In a third exemplary embodiment of a pre-compiling device in accordance with the present invention, when a source file code described below is input,

```
/*
<var name="APPLE" type="str" kind="define"/>
<var name="n_apples" type="int" kind="assign"/>
*/
```

Figure 3:
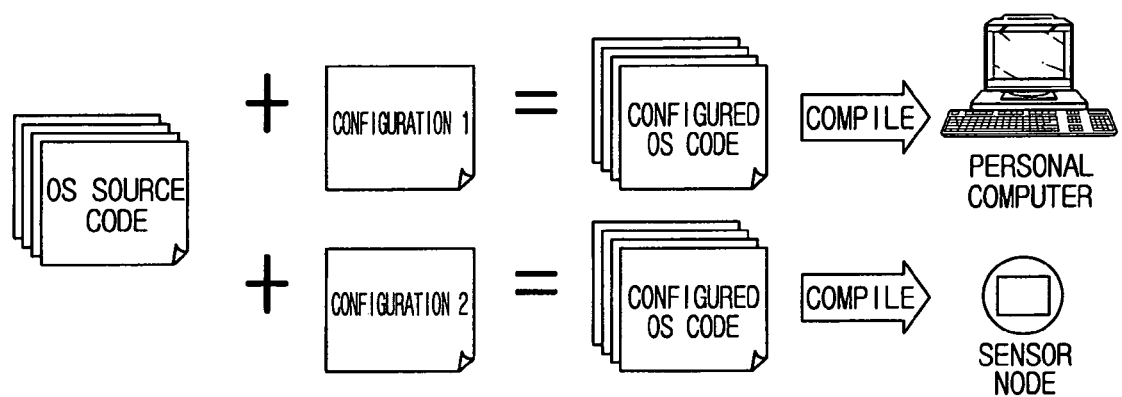
FIG. 3 is a schematic view illustrating the applicability of the pre-compiling device to a variety of hardware platforms according to an exemplary, non-limiting embodiment of the present invention.

The generated codes (when the user assigned values "apple" and "10") are
    #define APPLE "apple"
    Int n_apples=10;

FIG. 3 is a schematic view showing the application of the pre-compiling device to a variety of hardware platforms in accordance with an exemplary embodiment of the present invention. The pre-compiling device is applied to a variety of hardware platforms. Any source code can be generated so as to be suitable to a hardware platform by a pre-compiling device in accordance with an exemplary embodiment of the present invention. In particular, the OS source code is conformed to a configuration of the desired hardware platform to form the configured OS code. The configured OS codes can be applied to a subminiature sensor node computer and/or to a high capacity computer by compiling it.

Figure 4:
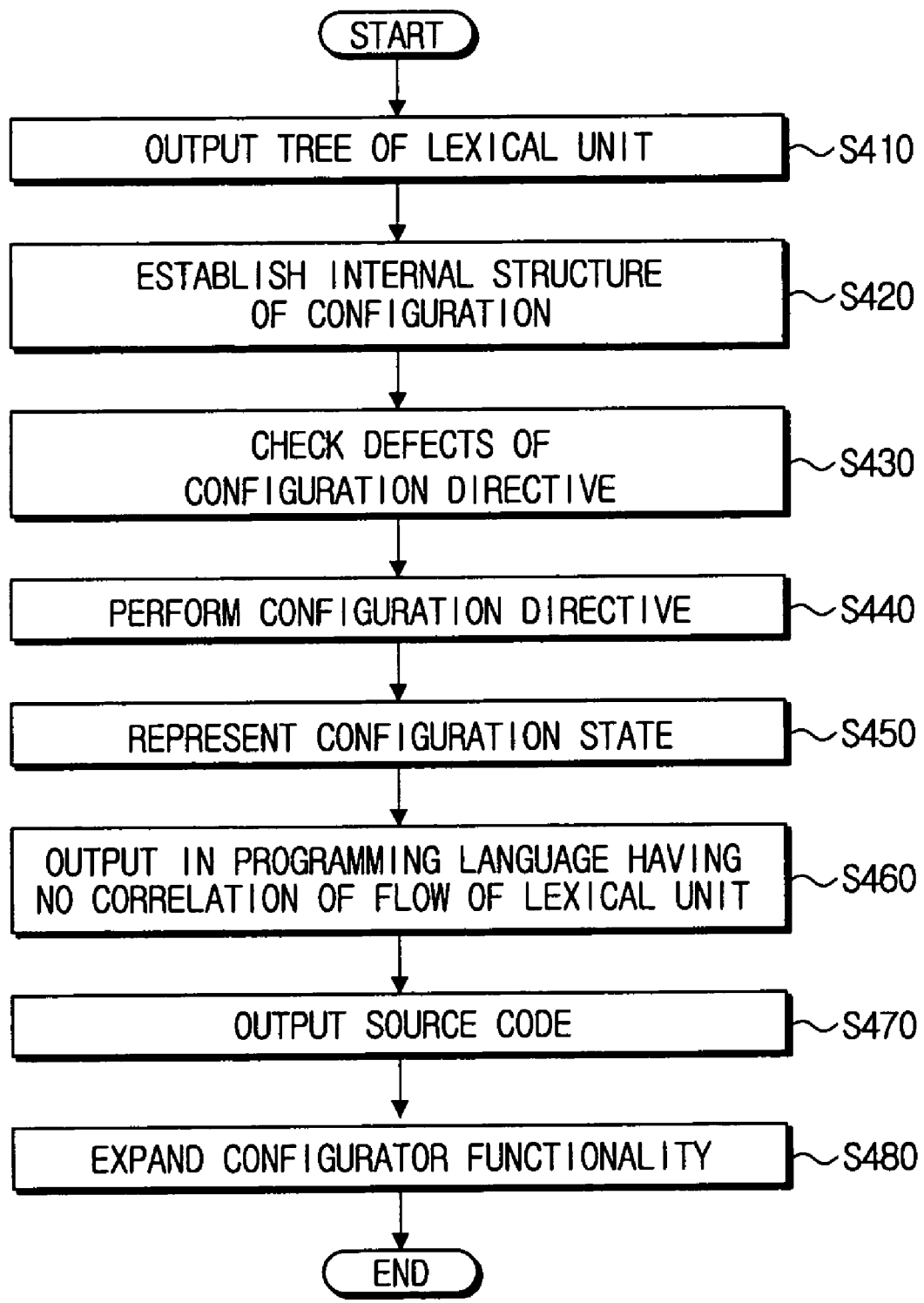
FIG. 4 is a flowchart showing a pre-compiling method according to an exemplary, non-limiting embodiment of the present invention.

FIG. 4 is a flowchart illustrating a pre-compiling method according to an exemplary embodiment of the present invention.

As shown in FIG. 4, at operation S410, a source code file is scanned, a configuration directive is retrieved, a syntax of the directive is analyzed, and a tree of lexical units corresponding to the configuration directives retrieved from the source codes is output. The output configuration directive is output in a configuration state by the following three operations S420, S430, and S440.

While the source code is scanned, an internal structure of the configuration is established, and the configuration state is output as internal object data at operation S420. Defects of the output configuration directive and a user input are checked and a corrected report is output at operation S430. The configuration directive internally represented is output in a configuration state and the configuration directive is performed at operation S440.

At operation S450, a current configuration state is represented by representing the output configuration state and input a user variable. The output configuration state is output in a programming language which has no correlation with a flow of the lexical unit at operation S460. At operation S470, information about a comment syntax of a corresponding language is transmitted, a programming language which has no correlation with the flow of the output lexical unit is received, and a source code is output.

At operation S480, an external language module is added to the programming language module 140 to expand configurator functionality without correcting the configuration program. The external language module may be writeable in an XML-based language. Also, an external code generation module may be added to the code generation module 130 to expand the configurator functionality without correcting the configuration program. The external code generation module may be writeable in the XML-based language.

According to at least some of the exemplary embodiments of the present invention described above, it is possible to easily change the software structure in compliance with hardware characteristics using the XML. Further, it is possible to generate software that can be simultaneously applied to a great number of various hardware platforms on a sensor network.

The foregoing embodiments are merely exemplary and are not to be construed as limiting the present invention. The exemplary methods can be readily applied to other types of devices. Also, the description of the embodiments of the present invention is intended to be illustrative, and not to limit the scope of the claims, and many alternatives, modifications, and variations will be apparent to those skilled in the art.

In other words, while the exemplary embodiments of the present invention have been particularly described with reference to the accompanying drawings, it will be understood by those of ordinary skill in the art that various changes in form and in details may be made therein without departing from the spirit and scope of the present invention as defined by the following claims. The principles and features of this invention may be employed in varied and numerous embodiments without departing from the scope of the invention.

What is claimed is:

1. A pre-compiling device comprising:
   a source code scanner, which scans for a source code file comprising unconfigured source code, retrieves a configuration directive from the unconfigured source code, analyzing a syntax of the configuration directive, and outputs a tree of a lexical unit corresponding to the configuration directive retrieved from the source code file;
   a core, which outputs the configuration directive in a configuration state;
   a graphical user interface, which interfaces between the core and a user, and represents an internal configuration state and represents a current configuration state based on a variable value input by the user;
   code generation modules, which derive from the configuration state output from the core, code in a programming language that has no correlation with a flow of the lexical unit;
   programming language modules, which transfer information on a comment syntax of the programming language to the source code scanner and the code generation modules, and receive the code in the programming language that has no correlation with the flow of the lexical unit received from the code generation modules, and insert the code in the programming language that has no correction with the flow of the lexical unit received form the code generation modules into the unconfigured source code file to create configured source code; and output source codes; and
   an external language module, which is added to the programming language modules, which expands a configurator functionality without correcting a configuration program and is written in a extensible markup language (XML)-based language;
   wherein at least one of the source code scanner, the core the graphical user interface, a code generation module, and a programming language module is performed by a hardware processor.

2. The pre-compiling device as claimed in claim 1, further comprising an external code generation module, which is added to the code generation modules, and which expands functionality without correcting the configuration program and is written in the XML-based language.

3. The pre-compiling device as claimed in claim 1, wherein the core comprises:
   a configuration state representation unit, which establishes an internal structure of the configuration and outputs the configuration state as an object internal data while the source code scanner is scanning the source code files;
   a configuration integrity controller, which checks for defects of the configuration directive output from the source code scanner and for user input, and outputs a corrected report; and
   a configuration language interpreter, which outputs the configuration directive represented internally as a configuration state and performs the configuration directive.

4. The pre-compiling device as claimed in claim 3, further comprising an external language module, which is added to the programming language modules, and which expands a configurator functionality without correcting a configuration program and is written in an extensible markup language (XML)-based language.

5. The pre-compiling device as claimed in claim 4, further comprising an external code generation module, which is added to the code generation modules, which expands the configurator without correcting the configuration program and is written in the XML-based language.

6. A pre-compiling method comprising:
   scanning, by a source code scanner, a source code file comprising unconfigured source code;
   retrieving a configuration directive from the unconfigured source code;
   analyzing a syntax of the retrieved configuration directive;
   outputting a tree of a lexical unit corresponding to the configuration directive;
   outputting the configuration directive in a configuration state;
   representing a current configuration states based on the output configuration state and a user variable input by a user;
   deriving, by a code generation module, from the current configuration state, code in a programming language which has no correlation with the flow of the lexical unit;
   transmitting information on a comment syntax of the programming language to the source code scanner and the code generation module;
   receiving by a programming language module, the code in the programming language which has no correlation with the flow of the lexical unit, and inserting the code in the programming language that has no correlation with the flow of the lexical unit into the unconfigured source code of the source file to create configured source code;
   adding an external language module to the programming language module;
   expanding a configurator functionality without correcting a configuration program; and writing the external language module in an extensible markup language (XML)-based language; and outputting the configured source code.

wherein a computer processor performs the function of at least one of the source code scanner, a code generation module, a programming language module.

7. The pre-compiling method as claimed in claim 6, further comprising:

adding an external code generation module to a code generation module;

expanding the configurator functionality without correcting the configuration program; and writing the external code generation module in the XML-based language.

8. The pre-compiling method as claimed in claim 6, wherein the outputting of the configuration directive in the configuration state comprises:

establishing an internal structure of the configuration directive while the source code file is scanned, and outputting the configuration state as an object internal data;

checking defects of the output configuration directive and a user input;

outputting a corrected report based on said checking;

outputting an internally represented configuration directive in a configuration state; and performing the configuration directive.

9. The pre-compiling method as claimed in claim 8, further comprising adding an external language module to a programming language module, expanding a configurator functionality without correcting a configuration program and writing the external language module in an extensible markup language (XML)-based language.

10. The pre-compiling method as claimed in claim 9, further comprising adding an external code generation module to a code generation module, expanding the configurator functionality without correcting the configuration program, and writing the external code generation module in the XML-based language.

11. A pre-compiling device comprising:

a source code scanner;

a core;

a graphical user interface;

at least one code generation module;

at least one programming language module;

a processor and a non-transitory computer readable medium, the processor performing the functions of at least one of the source code scanner, the cored, the graphical user interface, the at least one code generation module, and the at least one programming language module; and an external language module, which is added to the at least one programming language modules, which expands a configurator functionality without correcting a configuration program and is written in an extensible markup language (XML)-based language;

wherein:

a source code file comprising unconfigured source code;

the source code scanner scans the source code file to retrieve a configuration directive from the unconfigured source code, analyzing the configuration directive, and creates a tree of a lexical unit corresponding to the configuration directive retrieved from the source code file;

the core operates to create a first configuration state based on the configuration directive retrieved by the source code scanner;

the graphical user interface provides for an interface between a user and the core to allow for an input of a user variable value from the user;

the core outputs a second configuration state that is created based on the first configuration state and the input user variable value;

the at least one code generation module generates a code in a programming language that has no correlation with a flow of the lexical unit based on the second configuration state output by the core; and the at least one programming language module transfers information on a comment syntax of the programming language to the source code scanner and the at least one code generation module, and receives the generated code, and inserts the generated code into the unconfigured source code to create configured source code.

* * * * *